US00RE42687E

(19) United States
(12) Reissued Patent
Yoon

(10) Patent Number: US RE42,687 E
(45) Date of Reissued Patent: Sep. 13, 2011

(54) COOLING AIR SUPPLYING STRUCTURE FOR A REFRIGERATOR HAVING CANTILEVER SHELVES

(75) Inventor: Joong Oh Yoon, Pusan-si (KR)

(73) Assignee: LG Electronics Inc., Seoul (KR)

(21) Appl. No.: 11/195,872

(22) Filed: Aug. 3, 2005

Related U.S. Patent Documents

Reissue of:
(64) Patent No.: 6,347,530
Issued: Feb. 19, 2002
Appl. No.: 09/563,526
Filed: May 3, 2000

(30) Foreign Application Priority Data

May 10, 1999 (KR) ..... 99-16570

(51) Int. Cl.
*F25D 17/04* (2006.01)

(52) U.S. Cl. ..... 62/407; 62/412

(58) Field of Classification Search ..... 62/407, 62/412, 440; 454/237
See application file for complete search history.

(56) References Cited

U.S. PATENT DOCUMENTS

| | | | | |
|---|---|---|---|---|
| 4,735,470 A | | 4/1988 | Falk | |
| 5,285,655 A | * | 2/1994 | Sung-Il et al. | 62/451 |
| 5,664,436 A | | 9/1997 | Hawkins, Jr. et al. | |
| 5,664,437 A | * | 9/1997 | Park et al. | 62/407 |
| 5,960,641 A | | 10/1999 | Kim et al. | |
| 6,055,820 A | * | 5/2000 | Jeong et al. | 62/186 |
| 6,062,037 A | | 5/2000 | Yoon | |
| 6,094,931 A | | 8/2000 | Jeong | |

FOREIGN PATENT DOCUMENTS

| | | |
|---|---|---|
| CN | 1098780 | 2/1995 |
| CN | 1109962 | 10/1995 |
| JP | 4-116367 | 4/1992 |
| JP | 5-106958 | 4/1993 |
| JP | 7-253268 | 3/1995 |
| JP | 8-152246 | 6/1996 |
| JP | 9-49678 | 2/1997 |

OTHER PUBLICATIONS

English language abstract of JP 8-152246.
English language abstract of CN 119962.
English language abstract of JP 7-253268.
English language abstract of CN 1098780.
English language abstract of JP09-49678.
English language abstract of JP 4-116367.
English language abstract of JP 5-106958.

* cited by examiner

*Primary Examiner* — Melvin Jones
(74) *Attorney, Agent, or Firm* — Fish & Richardson P.C.

(57) ABSTRACT

A cooling air supplying structure for a refrigerator having shelves is disclosed. The cooling air supplying structure comprises a cooling air supplying duct, a plurality of shelf channels and a plurality of shelves. The cooling air supplying duct serves to supply cooling air to upper and lower portions of a refrigerator compartment of the refrigerator and is vertically mounted behind the refrigerator compartment. Each of the shelf channels has a plurality of engagement slits, and at least one of the shelf channels is mounted to the cooling air supplying duct. The shelves are respectively secured to the shelf channels.

24 Claims, 4 Drawing Sheets

COOLING AIR SUPPLYING STRUCTURE FOR A REFRIGERATOR HAVING CANTILEVER SHELVES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates, in general, to refrigerators and, more particularly, to a cooling air supplying structure for a refrigerator having cantilever shelves, which is capable of supplying cooling air to all the divisions of its refrigerator compartment at the same time without the loss of the usability of the shelves, thereby reducing the temperature difference in its refrigerator compartment without side effects.

2. Description of the Prior Art

FIGS. 1a and 1b are sectional views showing the general construction of a conventional refrigerator having cantilever shelves and, particularly, the cooling air circulating structure of the refrigerator.

As illustrated in the drawings, the interior of the refrigerator is divided into a freezer compartment 10 and a refrigerator compartment 30 by means of a barrier 20 that is filled with adiabatic material. An evaporator 12, through which a coolant of low temperature and low pressure passes, is mounted to the interior of a heat exchange chamber 11 that is situated in the rear portion of the freezer compartment 10. A fan 14 is provided over the evaporator 12 so as to forcibly send cooling air, which is generated in the evaporator 12, to the freezer compartment 10 and the refrigerator compartment 30.

A cooling air supplying passage 22, through which cooling air generated in the evaporator 12 of the heat exchange chamber 11 is supplied to the refrigerator compartment 30, and an air returning passage 24, through which air warmed while being circulated in the refrigerator compartment 30 is returned toward the evaporator 12, are formed in the barrier 20.

Referring to the drawings, the interior structure of the refrigerator compartment 30 is described in the following.

As shown in the drawings, the lower end of the cooling air supplying passage 22 formed in the barrier 20 is connected to a cooling air discharging unit 32. The cooling air discharging unit 32 is widely formed in the ceiling of the refrigerating compartment 30 and serves to discharge the cooling air supplied to the refrigerating compartment 30 to the lower portion of the interior of the refrigerating compartment 30. Additionally, a vegetable compartment 36 is provided in the lower portion of the refrigerator compartment 30, and a machine room M, in which a compressor, etc. are mounted, is formed in the lower, rear portion of the refrigerator.

The above-described construction is different from the construction of a general refrigerator without having cantilever shelves. In the construction of the general refrigerator without cantilever shelves, a cooling air supplying duct is vertically formed behind the refrigerator compartment 30 and on the cooling air supplying duct, a plurality of cooling air discharging holes are respectively formed on the divisions of the refrigerator compartment, thereby supplying cooling air to each of the divisions.

It is due to the mounting structure of cantilever shelves that the construction of the refrigerator having cantilever shelves is different from the construction of a general refrigerator.

Referring to FIG. 1b, the mounting structure of cantilever shelves is described in detail.

Generally, each of cantilever shelves 34 comprises a shelf body (not shown) on which food, drink, etc. are positioned and a support bracket (not shown) that is used to mount the shelf body to the interior of the refrigerator compartment 30. As illustrated in FIG. 1b, a plurality of shelf channels 38a each having a plurality of engagement holes 38a' are vertically mounted on the inner case 38 of the refrigerator compartment 30. The shelf channels 38a serve to retain the cantilever shelves 34 with the hooks of the support brackets respectively inserted into and engaged with the engagement holes 38a' of the shelf channels 38a.

In order to retain cantilever shelves 34 securely, two side shelves and one central shelf channel 38a are respectively and vertically mounted to both side portions and the central portion of the inner case 38 of the refrigerator chamber 30. In such a case, the mounting position of the central shelf channel 38a conflicts with the mounting position of the cooling air supplying duct of the general refrigerator without the cantilever shelves. Therefore, it is difficult that the refrigerator compartment 30 of the refrigerator having cantilever shelves is provided with the cooling air supplying duct.

Hereinafter, the circulation of the cooling air in the refrigerator having cantilever shelves is described with reference to FIGS. 1a and 1b.

Of the cooling air that is generated in the evaporator 12 mounted in the heat exchange chamber 11 of the refrigerator, a portion and the remaining portion of the cooling air are respectively supplied to the freezer compartment 10 and the refrigerator compartment 30 by means of the fan 14.

The cooling air that is supplied to the refrigerator compartment 30 descends down to the cooling air discharge unit 32 formed in the ceiling of the refrigerator compartment 30 through the cooling air supplying passage 22 formed in the barrier 20. The cooling air discharged from the cooling air discharge unit 32 enters the interior of the refrigerator compartment 30, and, subsequently, is supplied to divisions partitioned by the cantilever shelves 34 and the vegetable compartment 36 over a certain period of time.

The cooling air supplied to the refrigerator compartment 30 through the process is warmed in the process of the heat exchange with items stored in the refrigerator compartment 30, and the warmed air is returned toward the evaporator 12 through the air returning passage 24 formed in the barrier 20.

The coolant exchanges heat with the air in the evaporator 12 of the freezer compartment 10. The evaporated gaseous coolant enters the compressor 40 mounted in the machine room M. The coolant that has entered the compressor 40 is compressed and, thereafter, sent to a condenser (not shown). The condensed liquid coolant of low temperature and high pressure is depressurized in a capillary tube (not shown) and, thereafter, supplied to the evaporator 12 of the freezer compartment 10. This cycle is repeated continuously.

However, the conventional refrigerator having cantilever shelves has the following defects.

As illustrated in FIG. 1b, the cooling air supplied to the refrigerator compartment 30 is discharged via the cooling air discharging unit 32 formed in the ceiling of the refrigerator compartment 30, and, subsequently, is supplied from an uppermost cantilever shelf to a lowermost cantilever shelf over a certain period of time. As a result, the air of relatively high temperature reaches the lower shelves, which decreases its cooling speed. This hinders the interior of the refrigerator compartment 30 from being cooled uniformly. Additionally, since it is difficult for a consumer to confirm whether the cooling air reaches the lowermost shelf only by eyesight, the consumer cannot be convinced of the cooling performance of the refrigerator.

The reason for this is that the cooling air supplying duct cannot be mounted to the center portion of the inner case 38 of the refrigerator chamber 30 because the central shelf channel 38a is vertically mounted to the central portion of the inner case 38 of the refrigerator chamber 30.

On the other hand, when the cooling air supplying duct is mounted to the inner case 38 of the refrigerator compartment 30 while the cantilever shelves 34 are supported by means of the two side shelf channels 38a without the central cantilever channel 38a, the weight of the items that can be put on the cantilever shelves 34 is limited because the support force for the retaining of the cantilever shelves 34 is decreased.

Incidentally, when the cooling air supplying duct and the central shelf channel 38a are mounted to the inner case 38 of the refrigerator compartment 30, the central shelf channel 38a should be mounted over the cooling air supplying duct. In such a case, since the central shelf channel 38a is projected away from the cooling air supplying duct, a recess should be formed on the cantilever shelf 38a so as to receive the central shelf channel 38a, or the size of the cantilever shelf 38a should be decreased. Therefore, the appearance of the shelves is deteriorated and the space of storage on the shelves is reduced.

SUMMARY OF THE INVENTION

Accordingly, the present invention has been made keeping in mind the above problems occurring in the prior art, and an object of the present invention is to provide a cooling air supplying structure for a refrigerator having cantilever shelves, which is capable of reducing the temperature difference in the interior of the refrigerator while preventing its appearance from being deteriorated and its size from being reduced.

In order to accomplish the above object, the present invention provides a cooling air supplying structure for a refrigerator having shelves, comprising a cooling air supplying duct for supplying cooling air to the upper and lower portions of the refrigerator compartment of the refrigerator, the cooling air supplying duct being vertically mounted behind the refrigerator compartment, a plurality of shelf channels each having a plurality of engagement slits, at least one of the shelf channels being mounted to the cooling air supplying duct, and a plurality of shelves respectively secured to the shelf channels.

The cooling air supplying duct may be vertically recessed on its central portion, and the channel mounted to the cooling air supplying duct may be positioned within the recessed portion of the cooling air supplying duct.

A plurality of cooling air discharging holes may be formed along the side portions of the cooling air discharging duct beside the recessed portion of the cooling air supplying duct.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a front view showing the refrigerator compartment of the refrigerator of FIG. 1a;

FIG. 3b is a sectional view taken along line A-A of FIG. 3a;

FIG. 4b is a sectional view taken along line B-B of FIG. 4a.

DESCRIPTION OF THE PREFERRED EMBODIMENTS

Figure 1A:
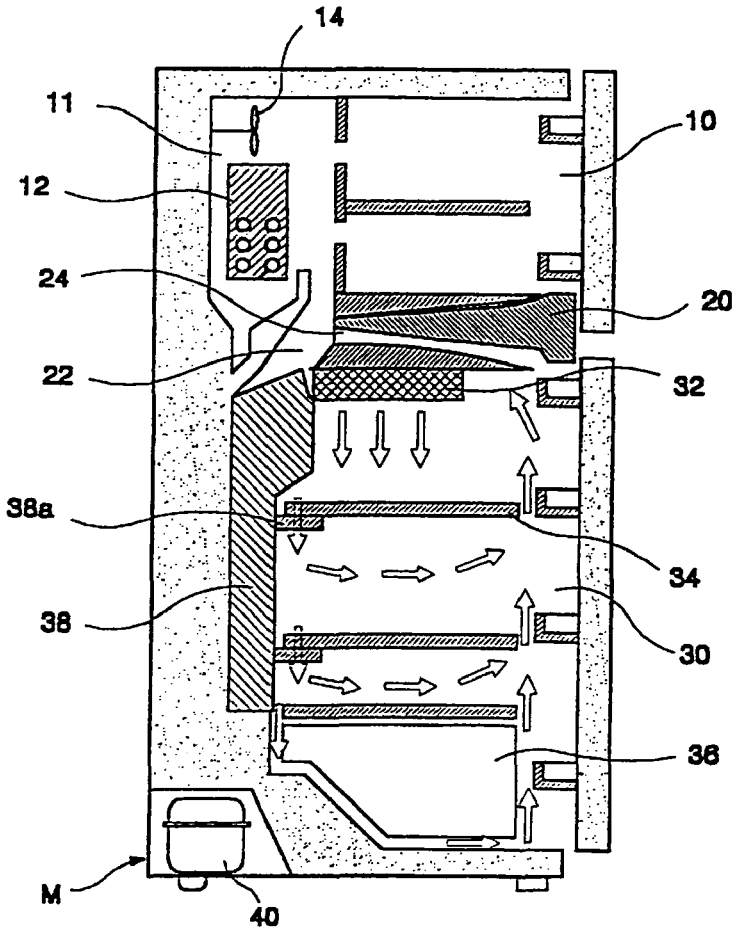
FIG 1a PRIOR ART
FIG. 1a is a sectional view showing the construction of a conventional refrigerator having cantilever shelves.
Figure 1B:
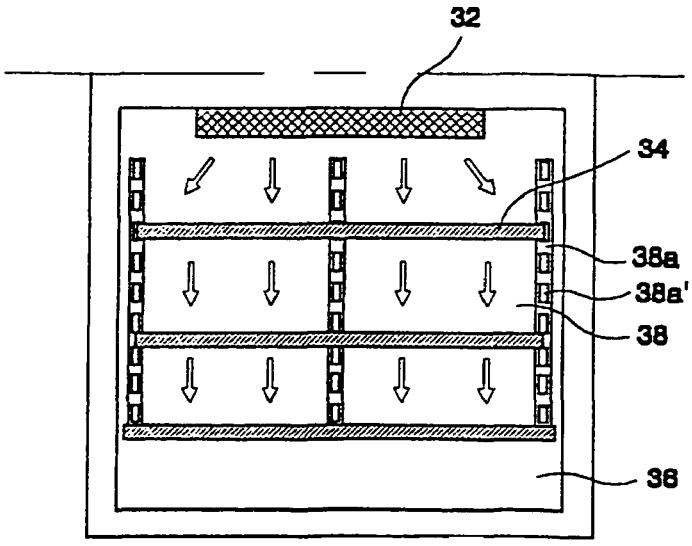
FIG 1b PRIOR ART

Reference now should be made to the drawings, in which the same reference numerals are used throughout the different drawings to designate the same or similar components.

Figure 2:
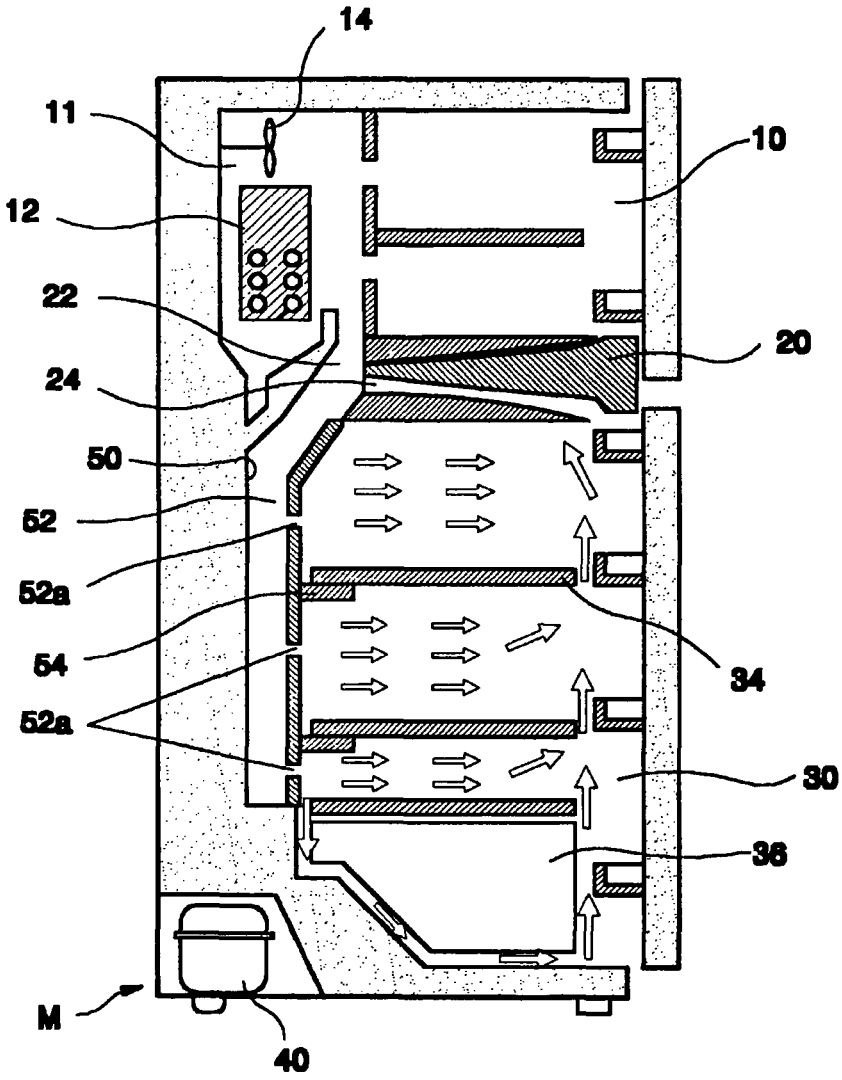
FIG. 2 is a sectional view showing the construction of a refrigerator provided with a cooling air supplying structure in accordance with the present invention.

FIG. 2 is a sectional view showing the construction of a refrigerator provided with a cooling air supplying structure in accordance with the present invention.

As illustrated in the drawings, the interior of the refrigerator is divided into a freezer compartment 10 and a refrigerator compartment 30 by means of a barrier 20 that is filled with adiabatic material.

A cooling air supplying passage 22 through which cooling air is supplied to the refrigerator compartment 30 is formed in the barrier 20. A cooling air supplying duct 52 is connected to the lower end of the cooling air supplying passage 22. The cooling air supplying duct 52 is vertically mounted to the front surface of the inner case 50. A plurality of discharge holes 52a are formed on the cooling air supplying duct 52 so as to allow the cooling air supplying duct 52 to communicate with the refrigerator compartment 30. Cooling air is supplied from the cooling air supplying duct 52 to the refrigerator compartment 30.

Figure 3A:
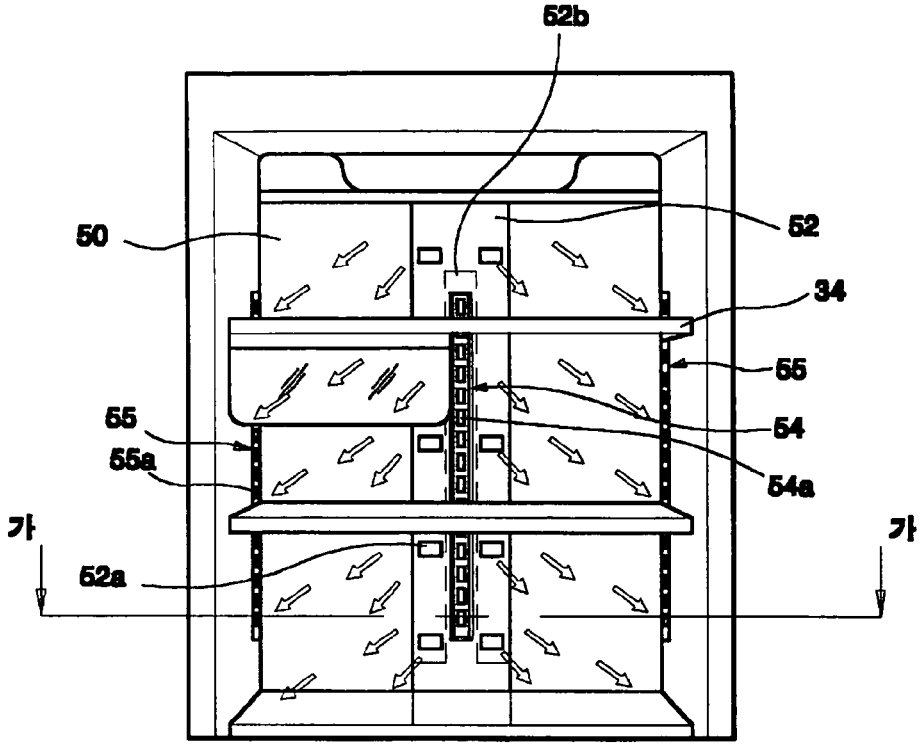
FIG. 3a is a front view showing the refrigerator compartment of the present invention with a refrigerator door being removed.
Figure 3B:
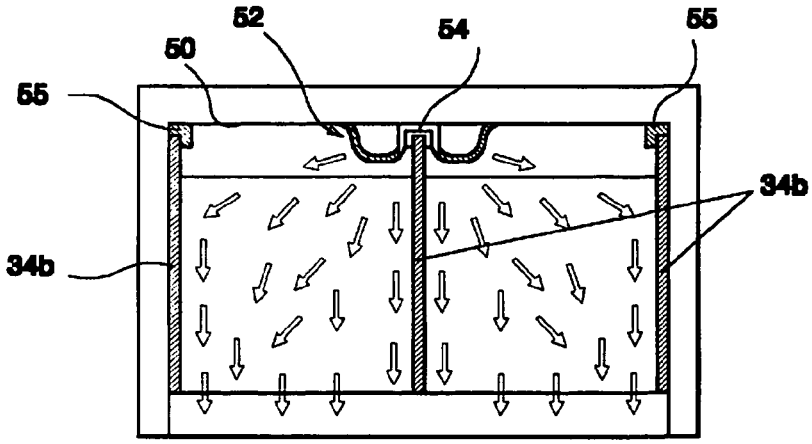

FIG. 3a is a front view showing the refrigerator compartment of the present invention with a refrigerator door being removed. FIG. 3b is a sectional view taken along line A-A of FIG. 3a.

As shown in the drawings, the cooling air supplying duct 52 is vertically recessed on its central portion, thus forming a recess 52b. The cooling air discharging holes 52a are formed on both side portions of the cooling air discharging duct 52 beside the recess 52b. A central shelf channel 54, to which cantilever shelves 34 are mounted, is mounted within the recess 52b of the cooling air discharging duct 52. A plurality of engagement slits 54a are formed along the central shelf channel 54 to which the hooks (not shown) of support brackets 34b are inserted.

Figure 4A:
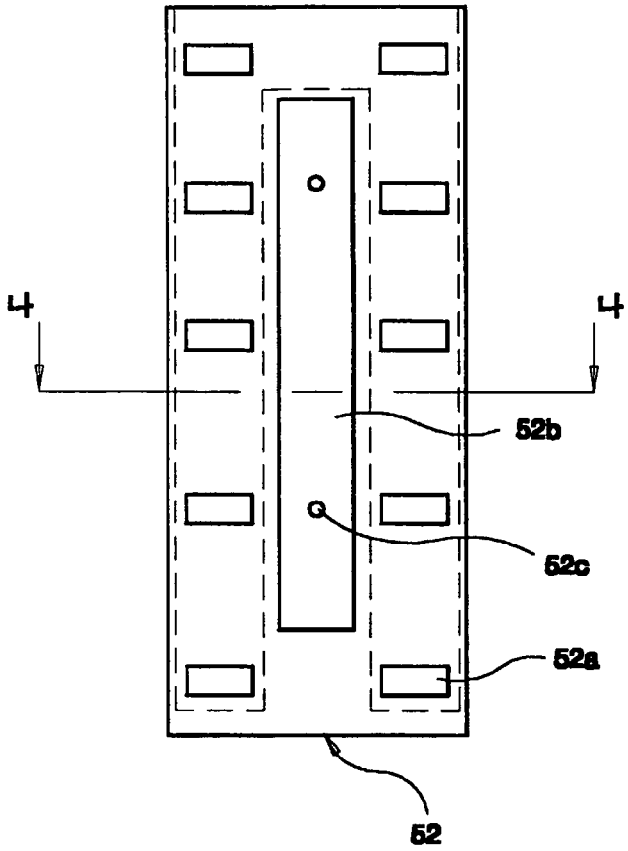
FIG. 4a is a detailed front view of the cooling air supplying duct 52.
Figure 4B:
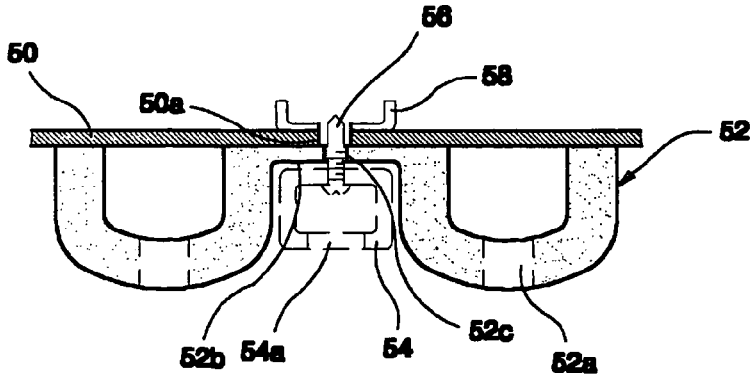

FIG. 4a is a detailed front view of the cooling air supplying duct 52. FIG. 4b is a sectional view taken along line B-B of FIG. 4a. As illustrated in the drawings and partially described above, the recess 52b is vertically formed on the central portion of the cooling air supplying duct 52. The cooling air discharging holes 52a are regularly formed on both side portions of the cooling air discharging duct 52 beside the recess 52b so as to discharge cooling air to the refrigerator compartment 30. Two fixation holes 52c that are used to fix the central shelf channel 54 are respectively formed on the upper and lower sub-portions of the recess 52b of the cooling air supplying duct 52.

Referring to FIG. 4b, the central shelf channel 54 is fixed to the recess 52b of the cooling air supplying duct 52 with screws 56 being tightened into the fixation holes 52a of the cooling air supplying duct 52. Of course, two fixation holes 50a are formed on the inner case 50, also. In such a case, if the screws 56 are tightened while the inner case 50 is lined with a reinforcement member 58, the central shelf channel 54 can be fixed to the inner case 50 more securely. Besides the central shelf channel 54 vertically fixed on the central portion of the inner case 50, two side shelf channels 55 each having a plurality of engagement slits 55a are mounted to the side portions of the inner case 50 of the refrigerator compartment 30. The cantilever shelves 34 are mounted to the inner case 50 of the refrigerator compartment 30 with the hooks of the support brackets 54 being inserted into and engaged with the engagement slits 54a and 55a of the shelf channels 54 and 55.

As shown in FIG. 4b, since the central shelf channel 54 is mounted within the recess 52a of the cooling air supplying duct 52, the inner ends of the central shelf channel 54 and the cooling air supplying duct 52 are positioned in a substantially same vertical plane. As a result, the shelf bodies 34 can be retained by the central shelf channel 54 while the areas of the support surfaces of the shelf bodies 34 are not reduced.

The operation of the cooling air supplying structure for a refrigerator in accordance with this embodiment is described in the following.

Of the cooling air that is generated in the evaporator 12 mounted in the heat exchange chamber 11 of the refrigerator, a portion and the remaining portion of the cooling air are respectively supplied to the freezer compartment 10 and the refrigerator compartment 30 by means of a fan 14.

The cooling air that is supplied to the refrigerator compartment 30 descends to the cooling air supplying duct 52 through the cooling air supplying passage 22 formed in the barrier 20. The cooling air in the cooling air supplying duct 52 is discharged to divisions partitioned by the cantilever shelves 34 and the vegetable compartment 36 through the cooling air discharging holes 52a that are opened toward the refrigerator compartment 30.

Since the cooling air is discharged to all the divisions of the refrigerator compartment 30 at the substantially same time, there is no temperature difference between an upper division and a lower division.

In addition, since the retaining force for the cantilever shelves and the area of the shelves are not reduced, the weight of items that are put on the shelves and space for use are not reduced.

As described above, the present invention provides a cooling air supplying structure for a refrigerator having cantilever shelves, in which a recess is vertically formed on the central portion of a cooling air supplying duct, thereby supplying cooling air to all the divisions of a refrigerator compartment at the same time without the change of the retaining structures and the shapes of cantilever shelves. Therefore, the temperature differences among the divisions of the refrigerator compartment are reduced while conventional cantilever shelves is employed in the refrigerator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling air supplying structure for a refrigerator having shelves, comprising:

a cooling air supplying duct for supplying cooling air to upper and lower portions of a refrigerator compartment of the refrigerator, said cooling air supplying duct being vertically mounted to an inner case at a rear wall of the refrigerator compartment;

a plurality of shelf channels, at least one of said shelf channels being mounted to said cooling air supplying duct; and a plurality of shelves respectively secured to said shelf channels,

*wherein said cooling air supplying duct is vertically recessed at a central portion thereof, and the at least one shelf channel mounted to said cooling air supplying duct is positioned within the recessed central portion of said cooling air supplying duct.*

[2. The structure according to claim 1, wherein said cooling air supplying duct is vertically recessed at a central portion thereof, and the at least one shelf channel mounted to said cooling air supplying duct is positioned within the recessed central portion of said cooling air supplying duct.]

3. The structure according to claim [2] *1*, wherein a plurality of cooling air discharging holes are formed along side portions of said cooling air discharging duct beside the recessed central portion of said cooling air supplying duct.

4. The structure according to claim 1, wherein the plurality of shelf channels each have a plurality of engagement slits, and wherein the plurality of shelves are secured to the plurality of shelf channels by means of the plurality of engagement slits.

5. [The structure according to claim 1,] *A cooling air supplying structure for a refrigerator having shelves, comprising:*

*a cooling air supplying duct for supplying cooling air to upper and lower portions of a refrigerator compartment of the refrigerator, said cooling air supplying duct being vertically mounted to an inner case at a rear wall of the refrigerator compartment;*

*a plurality of shelf channels, at least one of said shelf channels being mounted to said cooling air supplying duct; and*

*a plurality of shelves respectively secured to said shelf channels,* wherein the at least one shelf channel is mounted to the cooling air supplying duct by means of an attachment device inserted through a fixation hole formed in the cooling air supplying duct and a fixation hole formed in the inner case.

6. The structure according to claim 5, wherein the attachment device attaches to a reinforcement member disposed on a side of the inner [casing] *case* opposite to a side of the inner [casing] *case* to which the cooling air supplying [device] *duct* is mounted.

7. The structure according to claim [2] *1*, wherein the cooling air supplying duct comprises two protruding portions, one disposed on each side of the central recessed portion, and wherein [the] cooling air discharge holes are formed at a central portion of each of the protruding portions.

8. The structure according to claim 3, wherein the plurality of [engagement] *cooling air discharging* holes extend along a length of the cooling air supplying duct.

9. The structure according to claim 1, wherein the cooling air supplying duct is mounted to the inner case at the rear wall of the refrigerator compartment at a central portion thereof, and extends vertically.

*10. A cooling air supplying structure for a refrigerator having shelves, comprising:*

*a cooling air supplying duct for supplying cooling air to upper and lower portions of a refrigerator compartment of the refrigerator, said cooling air supplying duct being vertically mounted to an inner case at a rear wall of the refrigerator compartment;*

*a plurality of shelf channels, at least one of said shelf channels being mounted to said cooling air supplying duct; and*

*a plurality of shelves respectively secured to said shelf channels,*

*wherein the plurality of shelf channels comprise a plurality of engagement slits, and each of the shelves comprise a plurality of hooks configured to engage one of the engagement slits.*

*11. A cooling air supplying structure for a refrigerator having shelves, comprising:*

*a cooling air supplying duct for supplying cooling air to upper and lower portions of a refrigerator compartment of the refrigerator, said cooling air supplying duct being vertically mounted to an inner case at a rear wall of the refrigerator compartment;*

*a plurality of shelf channels, at least one of said shelf channels being mounted to said cooling air supplying duct; and*

*a plurality of shelves respectively secured to said shelf channels,*

*wherein the plurality of shelves comprise cantilever shelves, one end of each shelf being mounted to at least one shelf channel, an opposite end of each shelf extending toward a front side of the refrigerator compartment.*

*12. A cooling air supplying structure for a refrigerator having shelves, comprising:*

*a cooling air supplying duct for supplying cooling air to upper and lower portions of a refrigerator compartment of the refrigerator, said cooling air supplying duct being vertically mounted to an inner case at a rear wall of the refrigerator compartment;*

*a plurality of shelf channels, at least one of said shelf channels being mounted to said cooling air supplying duct; and*

*a plurality of shelves respectively secured to said shelf channels,*

*wherein the plurality of shelf channels each have a plurality of engagement slits,*

*wherein the plurality of shelves are secured to the plurality of shelf channels by means of the plurality of engagement slits, and*

*wherein the plurality of engagement slits extend along a length of each shelf channel.*

*13. The structure according to claim 1, wherein said cooling air supplying duct protrudes into the refrigerator compartment of the refrigerator.*

*14. The structure according to claim 1, wherein said cooling air supplying duct comprises a plurality of cooling air discharge holes disposed on each side of said at least one shelf channel mounted to said cooling air supplying duct.*

*15. The structure according to claim 14, wherein said plurality of cooling air discharge holes extend along a length of said cooling air supplying duct.*

*16. The structure according to claim 1, wherein the at least one shelf channel is mounted to a structure behind said cooling air supplying duct.*

*17. The structure according to claim 16, wherein the at least one shelf channel is mounted to the inner case.*

*18. The structure according to claim 5, wherein the at least one shelf channel is mounted to a structure behind said cooling air supplying duct.*

*19. The structure according to claim 18, wherein the at least one shelf channel is mounted to the inner case.*

*20. The structure according to claim 10, wherein the at least one shelf channel is mounted to a structure behind said cooling air supplying duct.*

*21. The structure according to claim 20, wherein the at least one shelf channel is mounted to the inner case.*

*22. The structure according to claim 11, wherein the at least one shelf channel is mounted to a structure behind said cooling air supplying duct.*

*23. The structure according to claim 22, wherein the at least one shelf channel is mounted to the inner case.*

*24. The structure according to claim 12, wherein the at least one shelf channel is mounted to a structure behind said cooling air supplying duct.*

*25. The structure according to claim 24, wherein the at least one shelf channel is mounted to the inner case.*

* * * * *